Feb. 25, 1969  J. M. HOOD  3,429,357
WINDSHIELD RAINSHIELD
Filed Sept. 23, 1966
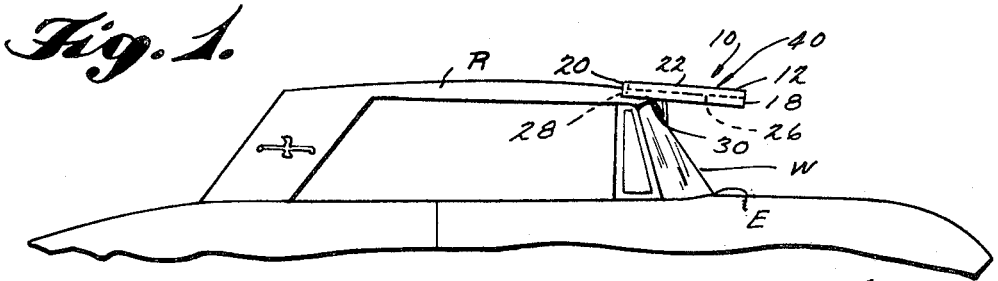
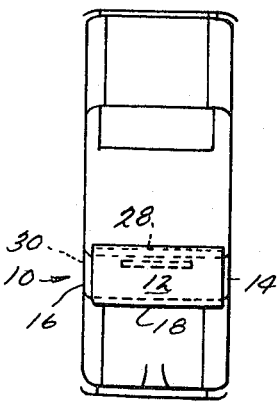
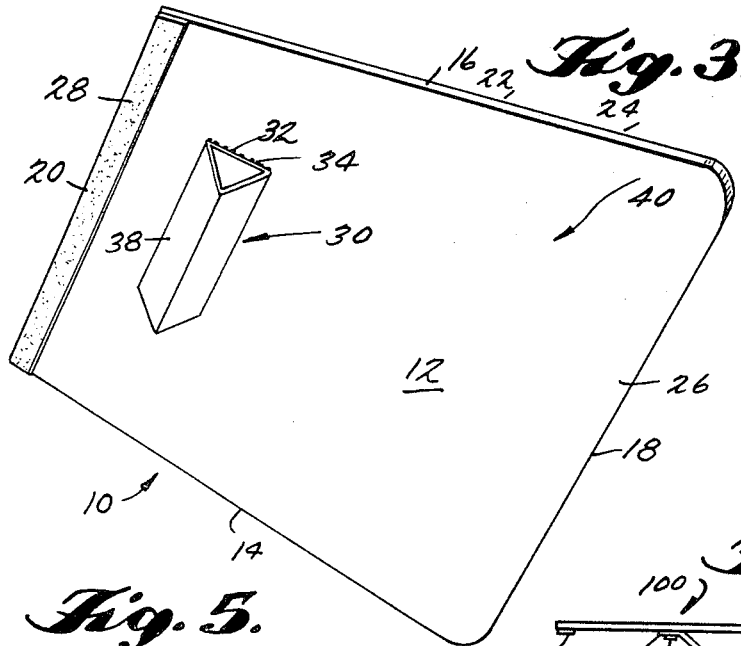
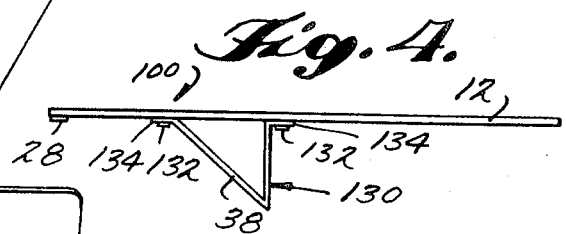
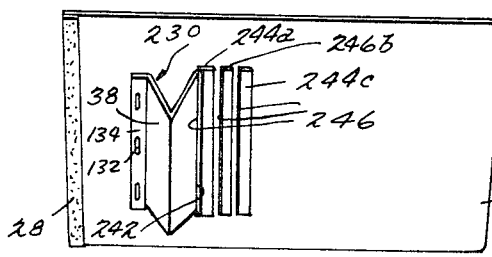
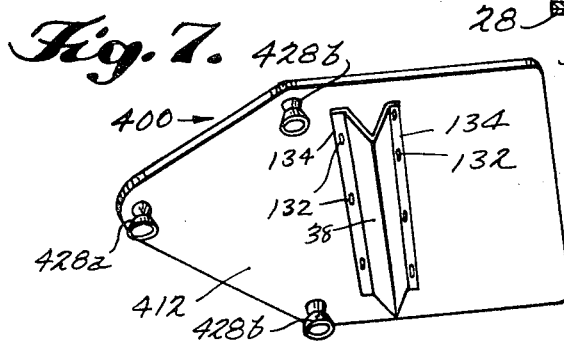
INVENTOR.
JAMES M. HOOD
BY
Cushman, Darby & Cushman
ATTORNEYS

United States Patent Office 3,429,357
Patented Feb. 25, 1969

3,429,357
WINDSHIELD RAINSHIELD
James M. Hood, P.O. Box 7243,
Garden City, Ga. 31408
Filed Sept. 23, 1966, Ser. No. 581,557
U.S. Cl. 160—368                               3 Claims
Int. Cl. E06b *3/30;* B60j *1/20*

ABSTRACT OF THE DISCLOSURE

A flexible sheet of fiber board, chip board, cardboard, box board, double face corrugated board or the like, coated on at least the upper face thereof with a water barrier coating and having fastening means secured on the lower face thereof near the trailing edge thereof and cantilevering support means secured on the lower face thereof intermediate the leading and trailing edges thereof, but preferably at least slightly nearer the trailing edge thereof, said cantilevering support means being constructed and arranged to engage the vehicle windshield so as to support the forward part of the rain-shield therefrom in a cantilevering fashion.

---

The present invention relates to means for shielding a vehicle windshield from precipitation, especially for use at drive-in movie theaters, to allow the vehicle occupants to clearly see the movie during inclement weather, without having to use the conventional windshield wipers which necessitate running the vehicle engine, and also tend to represent a distraction.

Patronage at outdoor theaters falls considerably when it is raining, or it looks as if precipitation will soon occur. In large measure this is because rain drops and rivulets falling on car windshields make it impossible to see the movies clearly unless the vehicle engine is run so that the windshield wipers can be operated. Not only do the engine noise and wiper motion cause distraction that may make movie watching unenjoyable, but the accumulation of carbon monoxide in the passenger compartment while the stationary, closed vehicle has it motors running, may be great enough in many vehicles to represent a serious threat to the lives and health of the occupants.

Accordingly, it is a primary object of the present invention to provide a windshield rainshield that can easily be secured in protecting relationship on varied vehicles to keep rain from falling on the windshield while the vehicle is stationary, for instance at a drive-in theater.

A further object of the invention is the provision of a rainshield of the type described, which is so inexpensive that it can be issued, at no extra charge or for a slight charge, by the theater management when rain seems imminent, or has begun to fall, and which can be discarded after a single use.

Yet another object of the invention is the provision of a flexible sheet of fiber board, chip board, cardboard, box board, double face corugated board or the like, coated on at least the upper face thereof with a water barrier coating and having fastening means secured on the lower face thereof near the trailing edge thereof and cantilevering support means secured on the lower face thereof intermediate the leading and trailing edges thereof, but preferably at least slightly nearer the trailing edge thereof, said cantilevering support means being constructed and arranged to engage the vehicle wind-shield so as to support the forward part of the rainshield therefrom in a cantilevering fashion.

An important object of the invention is the provision of a rainshield of the type described wherein the flexible sheet is constructed and configured to be flexed about a generally horizontal axis perpendicular to the width-wise extent thereof when operatively secured to a vehicle, thereby being provided with greater resistance to wilting in the cantilevered region thereof.

In one preferred form, the vehicle windshield rainshield comprises a sheet of flexible material having two opposite side edges, a leading edge, a trailing edge, an upper face and a lower face; means providing a water barrier on said upper face co-extensive therewith; means on the lower face of said sheet adjacent said trailing edge for removably securing said sheet to a vehicle roof just rearwardly of the vehicle windshield comprising an adhesive strip extending substantially from side-to-side of said sheet; and cantilevering support means secured on the lower face of said sheet intermediate the leading and trailing edges thereof, said cantilevering means being constructed and arranged to engage the vehicle windshield near the top of the windshield to thereby cantileveringly support the part of said sheet extending forwardly of said cantilevering means; said cantilevering means comprising means defining a downwardly facing forwardly and downwardly canted surface adapted to abut the vehicle windshield and means for varying the angle of canting of the canted surface; said canted surface comprising the lower surface on a cardboard strip secured to the sheet only at the rear margin of said strip and having a free forwardly and upwardly extending tab abuttable with selected points along said sheet lower surface.

These and further objects of the invention as well as the principles and scope of applicability thereof will become more clearly apparent during the course of the following detailed discussion that is keyed from time to time to the preferred, illustrative embodiments shown in the attacheed drawing.

In the drawing:

FIGURE 1 is a side elevation view of an automobile having a windshield rainshield according to an embodiment of the present invention secured thereto;

FIGURE 2 is a top plan view of the automobile of FIGURE 1, including a top plan view of the windshield rainshield embodiment;

FIGURE 3 is a bottom perspective view of the rainshield of FIGURES 1 and 2;

FIGURE 4 is a side elevation view of a first modification of the rainshield;

FIGURE 5 is a bottom perspective view of a second modification of the rainshield;

FIGURE 6 is a longitudinal vertical cross-sectional view of a third modification of the rainshield; and FIGURE 7 is a perspective view similar to FIGURE 4 of another embodiment of the rainshield.

As seen best in FIGURE 3 the rainshield 10 comprises a generally rectangular sheet of flexible sheet material 12 of, for instance about five feet in width from side edge 14 to side edge 16 and about two feet in length from leading edge 18 to trailing edge 20. The sheet material 12 preferably comprises paper such as fiber board, chipboard, cardboard, box board, double face corrugated board, or the like having at least the upper face 22 thereof covered with a continuous coating or adhered covering of water barrier material 24. Suitable material for the water barrier layer 24 includes wax; plastics modified wax; hot melt coatings of thermoplastics alone or modified with wax; solvent coatings of rubbery plastics; emulsion coatings, for instance of the Saran-type (modified polyvinylidene chloride); and extruded coatings of thermoplastics, for instance polyethylene, all applied by conventional techniques known to those in the art, for instance as set forth in Modern Packaging Encylopedia—1966, vol. 39, No. 4A, McGraw-Hill, Inc., New York (1965), pp. 109–117; or metal foil, such as laminated aluminum foil (Modern Packaging Encyclopedia—1966, pp. 162–166).

Along the lower face 26 of the sheet 12 next to the trailing edge 20, the rainshield 10 has a strip 28 of adhesive material that extends substantially from side edge 14 to side edge 16 and is about one-half to two inches wide. The strip 28 may comprise, for instance, a double faced strip of masking tape with one pressure sensitive adhesive surfaced face presented against the lower face of the sheet 12 and the other face presented downwardly. Alternatively the adhesive strip 28 may comprise, for example a layer of adhesive of the same type currently used on automobile bumper stickers. The later adhesive has the advantage of being coverable until use with a removable protector coated with a release coating so that many rainshields 10 can be stacked upon one another prior to protector removal without danger of the rainshields adhering to one another. This alternative also possesses the advantages that most users are already familiar with how to remove such protectors and, provided they are not left on for long periods of time, are easy to remove without damage to the vehicle exterior finish.

In the embodiment of FIGURES 1–3, forwardly of the trailing edge 20 and oriented so as to have its long axis generally parallel thereto, a cardboard, or the like tube 30, triangular in transverse cross-sectional shape, is secured to the lower face 26 of the sheet 12, for instance by a layer 32 of water proof adhesive such as casein glue, rubber contact cement or hot melt polyolefin resin, between the face 24 and one face 34 of the triangular tube 30. Preferably, the tube 30 extends along about the central third of the side-to-side width of the sheet 12 and is positioned near or at least slightly rearwardly of the middle of the sheet 12. So positioned, the tube 30 has a downwardly facing forwardly and downwardly canting rear surface 38.

To use the rainshield 10, the protector, if any is stripped from the adhesive layer 28, the rainshield 10 is then positioned, lower face down, above the car windshield with the trailing edge suprajacent the vehicle roof and moved rearwardly until the cantilevering support member 30 surface 38 abuts the windshield W. Because of the relative positioning of the member 30, for all but the most unusual of automobiles, the leading edge of the rainshield sheet 12 should then be above and extending at least slightly forwardly of the forward lower edge E of the windshield W. Next the trailing edge region of the sheet 12 is pressed against the vehicle roof R from above to removably adhere the sheet 12 to the roof R. Because of the conformance of the sheet trailing edge region to the side-to-side curved roof R due to the placement and extension of the adhesive layer 28, the rainshield bows about a generally horizontal axis parallel to the longitudinal axis of the automobile lending sufficient strength to the rainshield 10 that it can be expected to not wilt in the cantilevered region 40 thereof even though the sheet 12 is made of such material as cardboard.

Positioning the tube 30 so far rearwardly as is illustrated in FIGURES 1–3 insures that only a minimum amount of viewable windshield area will be obstructed by the rainshield 10 and the shortness of the tube 30 relative to the side-to-side extension of the sheet 12 insures that the tube 30 will not substantially obstruct the bending of the sheet 12 toward the lateral margins thereof where it is most important and where the vehicle roof is most sharply curved.

The modification 100 shown in FIGURE 4 differs from the rainshield 10 only in that the cantilevering member 130 has laterally forwardly and laterally rearwardly directed tabs 134 along its length instead of an upper triangle side 34, and is fastened to the sheet 12 by staples 132 rather than by adhesive 32.

The modification 200 shown in FIGURE 5 differs from the rainshield 100 only in that the cantilevering member 230 has only a rearwardly directed tab 134 and is free at its forward margin 242; forwardly of the mounting of the tab 134, a plurality of parallel strips of cardboard or the like 244a, 244b, 244c are secured to the underside of the sheet 12. Accordingly the free margin 242 of the cantilevering member can be placed against the trailing edge 246 of any of the strips 244a, 244b, 244c to adjust the support of the rainshield 200 to accommodate the rainshield 200 to windshields of varied slope. The rainshield 200 is shown readied to rest upon a relatively steep windshield.

The modification 300 of FIGURE 6 differs from the rainshield 200 only in that grooves 344a, 344b, 344c cut, pressed or otherwise formed in the sheet 312 are substituted for the applied strips 244a, 244b and 244c and the tab 134 is glued onto the sheet 312 at 332 rather than being stapled.

In the embodiment 400 shown in FIGURE 7, the trailing edge of the sheet 412 has been extended rearwardly centrally so that it is generally rearwardly convex. The adhesive strip 28 has been replaced by a suction cup 428a near the apex of the trailing edge and a suction cup 428b at each lateral margin of the trailing edge. The embodiment 400 is especially well adapted for reuse and the flexible sheet thus can be made of more durable material such as sheet metal, heavy gauge stiffly flexible plastic film or the like. Otherwise the rainshield 400 is materially the same as that of FIGURE 4.

It should now be apparent that the invention described herein accomplishes all of the objects set forth at the outset of this specification and the described embodiments clearly illustrate the principles of the invention.

I claim:

1. A vehicle windshield rainshield comprising a sheet of flexible material having two opposite side edges, a leading edge, a trailing edge, an upper face and a lower face; means providing a water barrier on said upper face coextensive therewith; means on the lower face of said sheet adjacent said trailing edge for removably securing said sheet to a vehicle roof just rearwardly of the vehicle windshield comprising an adhesive strip extending substantially from side-to-side of said sheet; and cantilevering support means secured on the lower face of said sheet intermediate the leading and trailing edges thereof, said cantilevering means being constructed and arranged to engage the vehicle windshield near the top of the windshield to thereby cantileveringly support the part of said sheet extending forwardly of said cantilevering means; said cantilevering means comprising means defining a downwardly facing forwardly and downwardly canted surface adapted to abut the vehicle windshield and means for varying the angle of canting of the canted surface; said canted surface comprising the lower surface on a cardboard strip secured to the sheet only at the rear margin of said strip and having a free forwardly and upwardly extending tab abuttable with selected points along said sheet lower surface.

2. The rainshield of claim 1 wherein said flexible material comprises paper and said water barrier comprises a coating of plastic material.

3. A vehicle windshield rainshield comprising a sheet of flexible material having two opposite sides edges, a leading edge, a trailing edge, an upper face and a lower face; means providing a water barrier on said upper face coextensive therewith; means on the lower face of said sheet adjacent said trailing edge for removably securing said sheet to a vehicle roof just rearwardly of the vehicle windshield; and cantilevering support means secured on the lower face of said sheet intermediate the leading and trailing edges thereof, said cantilevering means being constructed and arranged to engage the vehicle windshield near the top of the windshield to thereby cantileveringly support the part of said sheet extending forwardly of said cantilevering means; said cantilevering means comprising: an elongated member of V-shaped cross section on the lower face of said sheet of flexible material so as to extend transversely thereof; said elongated member including a rear portion having a downwardly facing forwardly and downwardly canted surface adapted to abut the vehicle windshield and a forward portion extending between the lower extent of the rear portion and the lower face of said sheet of flexible material, forwardly of said rear portion; means securing said elongated member at the rear, upper margin of said rear portion and at the forward, upper margin of said forward portion, to said sheet of flexible material.

References Cited

UNITED STATES PATENTS

| | | | |
|---|---|---|---|
| 2,716,572 | 8/1955 | Soucy | 296—95 |
| 2,797,961 | 7/1957 | McKay | 160—368 |
| 3,048,439 | 8/1962 | Brigmon | 160—368 |
| 3,279,845 | 10/1966 | Lutz | 160—368 X |

DAVID J. WILLIAMOWKSY, *Primary Examiner.*

PHILIP C. KANNAN, *Assistant Examiner.*

U.S. Cl. X.R.

296—95